US011711407B2

(12) United States Patent
Braganza et al.

(10) Patent No.: US 11,711,407 B2
(45) Date of Patent: *Jul. 25, 2023

(54) AUTOMATED PAUSING OF AUDIO AND/OR VIDEO DURING A CONFERENCING SESSION

(71) Applicant: MITEL NETWORKS CORPORATION, Kanata (CA)

(72) Inventors: Jonathan Braganza, Ottawa (CA); Kevin Lee, Kanata (CA)

(73) Assignee: Mitel Networks Corporation, Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,000

(22) Filed: Aug. 4, 2021

(65) Prior Publication Data
US 2023/0038109 A1 Feb. 9, 2023

(51) Int. Cl.
*H04L 65/403* (2022.01)
*G10L 25/51* (2013.01)
*G06V 20/40* (2022.01)

(52) U.S. Cl.
CPC ............ *H04L 65/403* (2013.01); *G06V 20/41* (2022.01); *G10L 25/51* (2013.01)

(58) Field of Classification Search
CPC ........... H04L 29/06; H04L 25/51; G06K 9/00; H04N 7/15; H04N 7/14; H04N 7/147; H04N 5/23229
USPC ............................................ 348/14.01–14.16
See application file for complete search history.

(56) References Cited

U.S. PATENT DOCUMENTS

| 9,794,514 B1* | 10/2017 | Yoakum ................. H04M 3/566 |
| 9,888,211 B1 | 2/2018 | Browne et al. |
| 11,082,465 B1* | 8/2021 | Chavez .................. G06V 20/40 |
| 2008/0136895 A1* | 6/2008 | Mareachen ............ H04N 7/147 348/14.03 |
| 2008/0297586 A1 | 12/2008 | Kurtz et al. |
| 2012/0327176 A1* | 12/2012 | Kee .......................... H04N 7/15 348/E7.083 |
| 2014/0049593 A1* | 2/2014 | Pai ....................... H04M 3/5183 348/14.01 |
| 2015/0097919 A1* | 4/2015 | Karimi-Cherkandi ....................... H04W 52/027 348/14.07 |
| 2015/0358581 A1 | 12/2015 | Zhou et al. |

(Continued)

OTHER PUBLICATIONS

Amazon Web Services, Inc., "Amazon Rekognition," 2021, 11 pages, Retrieved from the Internet on Jul. 6, 2021 at URL: aws.amazon.com/rekognition/?blog-cards.sort-by=item.additionalFields.createdDate&blog-cards.sort-order=desc.

(Continued)

*Primary Examiner* — Melur Ramakrishnaiah

(57) ABSTRACT

Embodiments include an audio analyzer to analyze audio data received from a user computing system operating as a participant in a conference managed by a conferencing application and to detect one or audio pause conditions; a video analyzer to analyze video data received from the user computing system and to detect one or video pause conditions; and a conferencing manager to automatically pause distribution of the audio data to other participants of the conference when the one or more audio pause conditions are detected and automatically pause distribution of the video data to the other participants when the one or more video pause conditions are detected.

20 Claims, 8 Drawing Sheets

(56) References Cited

U.S. PATENT DOCUMENTS

| | | |
|---|---|---|
| 2016/0260436 A1 | 9/2016 | Lemay et al. |
| 2020/0110572 A1 | 4/2020 | Lenke et al. |
| 2021/0218845 A1* | 7/2021 | Magi .................... G06V 40/18 |
| 2021/0306561 A1* | 9/2021 | VanBlon ................ H04N 5/272 |
| 2021/0409465 A1* | 12/2021 | Garrett .................. G10L 15/30 |
| 2022/0408059 A1* | 12/2022 | Stonehocker .......... H04N 7/152 |

OTHER PUBLICATIONS

Fritz AI, "Object Detection Guide," 2021, 11 pages, Retrieved from the Internet on Jul. 6, 2021 at URL: fritz.ai/object-detection.

Google, "Vision AI," 2021, 10 pages, Retrieved from the Internet on Jul. 6, 2021 at URL: cloud.google.com/vision/.

Microsoft, "Computer Vision," 2021, 2 pages, Retrieved from the Internet on Jul. 6, 2021 at URL: azure.microsoft.com/en-us/services/cognitive-services/computervision/#overview.

* cited by examiner

AUTOMATED PAUSING OF AUDIO AND/OR VIDEO DURING A CONFERENCING SESSION

FIELD

Embodiments relate generally to conferencing applications in computing systems, and more particularly, to automatically pausing audio and/or video transmissions during sessions of conferencing applications.

BACKGROUND

The use of audio and video conferencing applications is widespread. Millions of users communicate with co-workers, friends, and family using their computing devices (e.g., personal computers, smart phones, and tablet computers) and audio and video conferencing hardware (e.g., cameras, microphones) and software (e.g., commercially available application programs such as Teams and Skype from Microsoft® Corporation, Zoom from Zoom Video Communications, Inc., and Webex® available from Cisco Systems, Inc.).

During a conferencing session (whether audio or video), there may be times when a user may be distracted, interrupted, are briefly unable to participate in the conference, or have temporary loud background noises. If the user has to engage in another conversation (e.g., on a phone call on his or her personal cell phone), and the audio of the conferencing session is not muted, it can be distracting to others in the conference. Also, if the user temporarily leaves the conference, the user's video will still be communicating the user's background to other participants, resulting in unnecessary bandwidth being used for the conference, as well as possibly broadcasting unwanted events to other participants.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

The technology disclosed herein provides a method and system for automatically pausing the audio and/or video portions of audio video data during an audio or video conferencing session. In one embodiment, a conferencing application (whether utilizing audio, video, or audio and video) automatically analyzes the audio video data received from a user computing system and automatically pauses the communication of the user's audio and/or video to other participants of the conferencing session when one or more detected events is occurring. When the one or more detected events is no longer occurring, the communication of the user's audio and/or video to other participants is automatically resumed.

Figure 1:
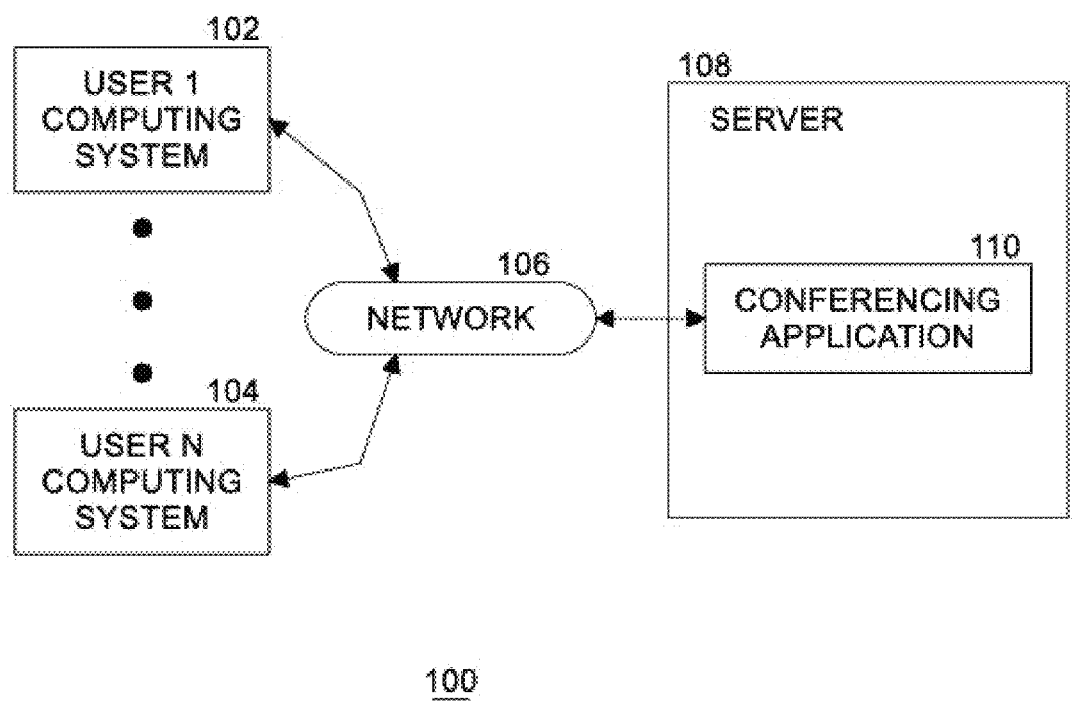
FIG. 1 illustrates an example conferencing system environment.

FIG. 1 illustrates an example conferencing system environment 100. A plurality of users operates user computing systems, such as user 1 computing system 102 to user N computing system 104, where N is a natural number. User computing systems can be any computing device capable of running an audio or video conferencing application providing conferencing functionality (e.g., computing devices with a camera and a microphone, such as personal computers, smartphones, tablet computers, personal digital assistants, kiosks, etc.). Users operating computing systems communicate with each other using conferencing application 110, which may be running on a server 108 and coupled to the user computing systems over a network 106 (e.g., an intranet or the Internet). Conferencing application 110 is an audio-conferencing application or a video conferencing application that manages an audio conference, a video conference, or an audio and video conference. Server 108 may be situated in a data center, such as those operated by cloud service providers (CSPs), Internet service providers (ISPs) or by the information technology (IT) departments of organizations. At least a portion of conferencing application 110 may be running on the user computing systems (for example, to provide multimedia user interface (UI) capability for the users to see and talk to the other users).

Figure 2:
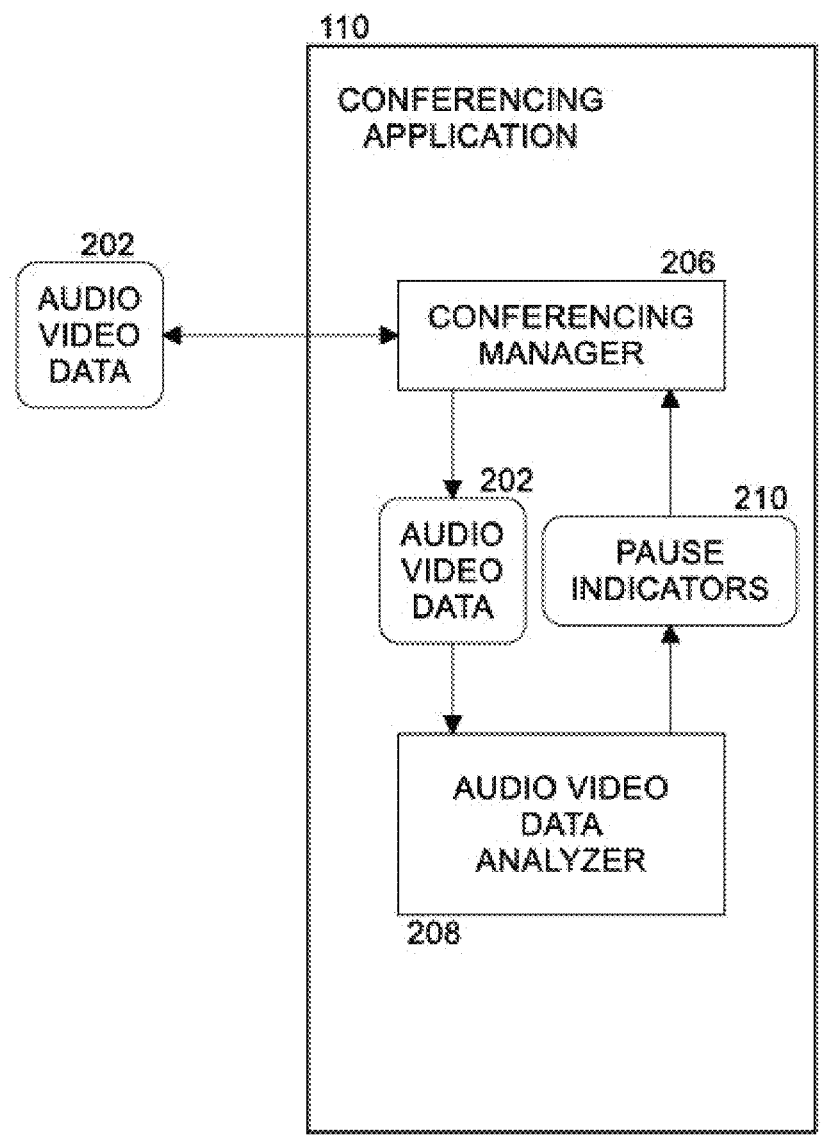
FIG. 2 illustrates a conferencing application according to some embodiments.

FIG. 2 illustrates conferencing application 110 according to some embodiments. Conferencing application 110 includes conferencing manager 206 to send and receive audio and video data 202 to and from user computing systems 102 . . . 104 according to well-known methods. As used herein, audio video data 202 may include only audio data or audio and video data. In an embodiment, conferencing application 110 continually receives audio video data 202 from user computing systems operating as participants in a conference and forwards the audio video data to other user computing systems operating as participants of the conference. In an embodiment, conferencing application 110 includes conferencing manager 206 to control the forwarding of audio video data 202 to the user computer systems operating as participants in the conference.

Conferencing manager 206 sends audio video data 202 to audio video data analyzer 208. Audio video data analyzer 208 continually analyzes the audio video data 202 during the conference and determines if an audio pause condition is detected, a video pause condition is detected, or both an audio pause condition and a video pause condition is detected. When any one of these conditions is detected, audio video data analyzer 208 sends one or more pause indicators 210 to conferencing manager 206. If conferencing manager 206 receives an audio pause indicator for a user computing system, conferencing manager 206 pauses the distribution of audio data from the user computer system to other user computer systems in the conference. If conferencing manager 206 receives a video pause indicator for a user computing system, conferencing manager 206 pauses the distribution of video data from the user computer system to other user computer systems in the conference. If conferencing manager 206 receives an audio pause indicator and a video pause indicator for a user computing system, conferencing manager 206 pauses the distribution of audio and video data from the user computer system to other user computer systems in the conference. Audio video data 202 is still sent by user computer systems to conferencing manager 206 and forwarded to audio video data analyzer 208, but this audio and/or video data is not distributed to other participants of the conference if audio and/or video pause indicators have been received.

Audio video data analyzer 208 continues to analyze audio video data 202 during any pause scenario. Audio video data analyzer 208 may then determine that audio and/or video data distribution from the user computing system may be resumed. Thus, audio video data analyzer 208 determines if an audio pause condition is no longer needed, a video pause condition is no longer needed, or both an audio pause condition and a video pause condition are no longer needed. When any one of these resume conditions is detected, audio video data analyzer 208 sends one or more negative (or cleared) pause indicators 210 to conferencing manager 206. If conferencing manager 206 receives a negative (or cleared) audio pause indicator for a user computing system, conferencing manager 206 resumes the distribution of audio data from the user computer system to other user computer systems in the conference. If conferencing manager 206 receives a negative (or cleared) video pause indicator for a user computing system, conferencing manager 206 resumes the distribution of video data from the user computer system to other user computer systems in the conference. If conferencing manager 206 receives a negative (or cleared) audio pause indicator and a negative (or cleared) video pause indicator for a user computing system, conferencing manager 206 resumes the distribution of audio and video data from the user computer system to other user computer systems in the conference.

Figure 3:
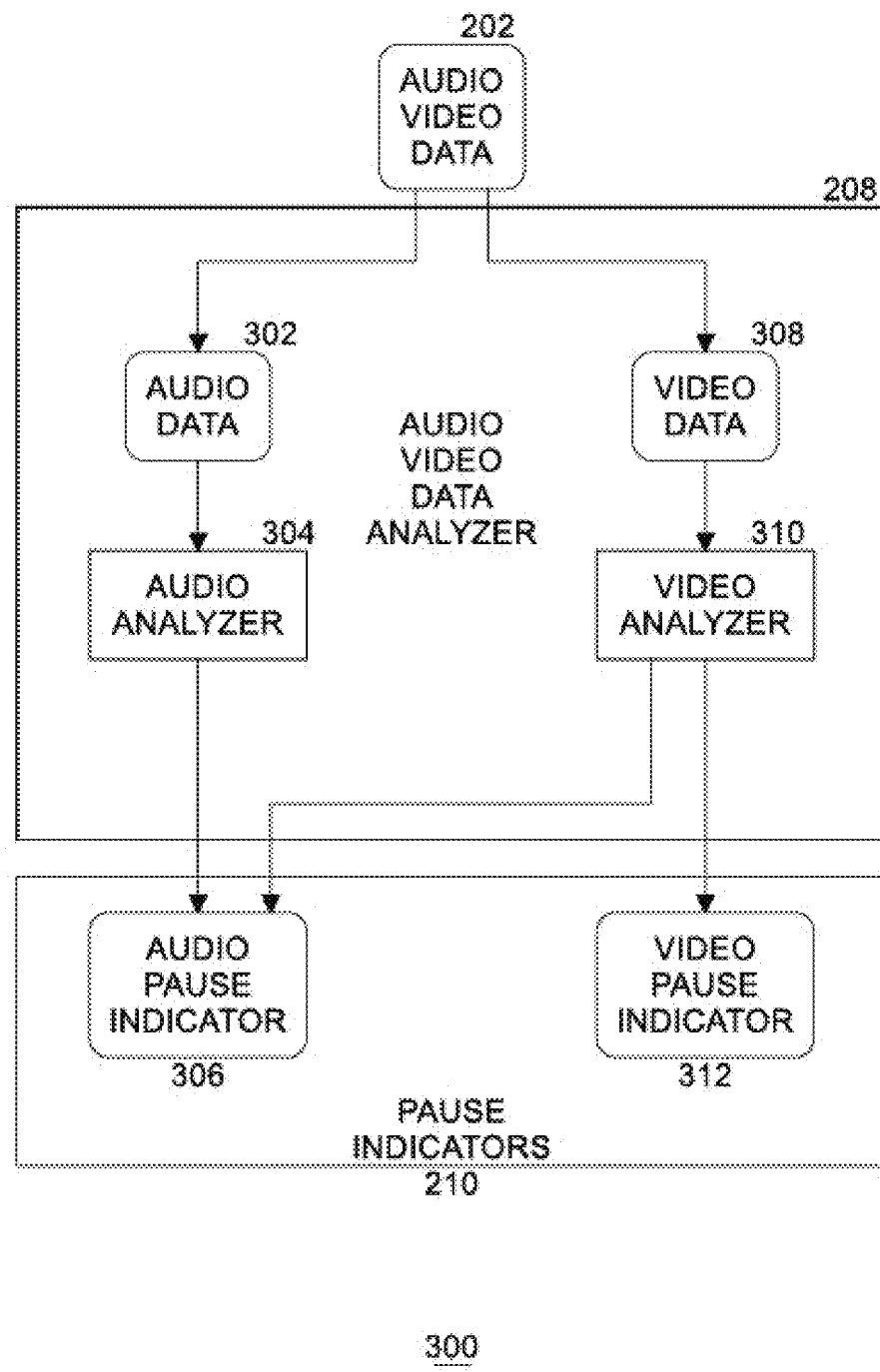
FIG. 3 is a diagram of an audio video data analyzer according to some embodiments.

FIG. 3 is a diagram of an audio video data analyzer 208 according to some embodiments. Audio video data analyzer 208 comprises audio analyzer 304 to analyze audio data 302 from audio video data 202 and video analyzer 310 to analyze video data 308 from audio video data 202. In an embodiment, audio analyzer 304 and video analyzer 310 operate simultaneously and in parallel. In an embodiment, video data 308 also includes audio data 302 (e.g., combined audio and video data). Audio analyzer 304 analyzes audio data 302 to set audio pause indicator 306 of pause indicators 210. Audio pause indicator 306 may be set to indicate a pause from or a resume for forwarding audio data 302 from a user computing system to other participants of a conference. In an embodiment, the audio pause indicator may be set to a positive indication (e.g., yes, 1, set) to pause the audio and a negative indication (e.g., no, 0, cleared) to resume the audio. Video analyzer 310 analyzes video data 308 to set video pause indicator 312 of pause indicators 210. Video pause indicator 312 may be set to indicate a pause from or a resume for forwarding video data 308 from a user computing system to other participants of a conference. In an embodiment, the video pause indicator may be set to a positive indication (e.g., yes, 1, set) to pause the video and a negative indication (e.g., no, 0, cleared) to resume the video. In an embodiment, video analyzer 310 may also update audio pause indicator 306 as a result of video analysis.

Video analyzer 310 comprises a video tracking process which analyzes sequential video frames and determines changes in objects between frames. This technique can be used to determine, for example, if a user (e.g., a conference participant) leaves the field of view of the camera of the user computing system or if the user picks up his or her cell phone and the cell phone comes into view of the camera.

Object detection is a well-known technique that is frequently used in video application programs. Object detection provides for identification and location of objects within an image or video frames. This allows for detection of specific objects within a video and drawing of boxes around the object (also called bounding boxes) to help determine locations of objects in video frames. Once this is done, movement of the objects in the video frames can be determined. This allows video analyzer 310 to identify when a specific object leaves the frame.

Examples of known objection recognition programs that may be used in various embodiments include Fritz.ai for Mobile from Fritz.ai, the Google Vision application programming interface (API) from Google, Inc., the Microsoft Computer Vision API from Microsoft Corporation, and AWS Rekognition from Amazon.com, Inc. Other object recognition, image recognition, and/or video processing applications may also be used. In an embodiment, video analyzer 310 is programmed to detect objects, changes in objects (e.g., location, appearance, etc.), object movement, and/or object behaviors causing video pause indicator 312 (and possibly also audio pause indicator 306) to be set for the user. In an embodiment, video analyzer may employ a trained model and well-known machine learning techniques to perform object location, identification and tracking.

For example, the user (e.g., a conference participant) may be detected by video analyzer 310 as leaving the video frame. Using object detection, video analyzer 310 identifies an object in the video frame as the user. Once the user has been identified, video analyzer 310 tracks the location of the user over time and detects when the user leaves the frame of the video. In an embodiment, video analyzer 310 monitors the amount of time the user was out of the frame and differentiates between leaving the frame momentarily versus a longer time period (e.g., the user going out of the room for 10 seconds versus the user bending down to pick up a dropped pen for one second).

In another example, a cell phone may be detected as being put against the user's head in the video frames (e.g., when answering a personal cell phone or land line telephone handset). Using object detection, video analyzer 310 identifies any phones in the video frame, or the addition of a cell phone or land line telephone handset into the video frame. Video analyzer 310 tracks the positioning of the phone and the user's head, and if the phone enters the bounding box describing the user's head it can be assumed that the user is actively using the phone.

In another example, video analyzer 310 may detect when a user removes his or her wired head set or removes a wireless (e.g., Bluetooth-enabled) ear bud from his or her ear. In image recognition processing similar to processing of the phone example, video analyzer 310 detects when a wired or wireless headset is removed from the bounding box containing the user's head. This would only apply if the user is already wearing the headset/ear bud in a reference frame or if the headset/ear bud enters the frame.

Further, video analyzer 310 may detect if someone else enters the video frame (e.g., a family member or a pet). At the start of the conference, video analyzer 310 identifies the participant of the conference (e.g., the user of the user computing system). If video analyzer 310 detects that there is another person, animal, or other object that enters the frame for a period of longer than five seconds, for example, video analyzer may set video pause indicator 312.

In other embodiments, any other scenario may be programmed into video analyzer 310 for detecting conditions to set video pause indicator 312. Any subsequent change in any of the above or other scenarios (e.g., an inverse condition) results in resuming the video (e.g., the user re-enters the frame for a time to rejoin the conference, the user puts the phone down, the user reinstalls the headset/ear bud, the family member or pet leaves the frame, etc.). In an embodiment, the image of the person (e.g., the user) leaving the frame is compared to an image of person entering the frame to determine if the two images portray the same person. In this case, the video data may be resumed. If the images are of two different people, the video data may continue to be paused.

In an embodiment, the time setting and/or scenarios are configurable or selectable as parameters of conferencing application 110. For example, a user may desire to pause the video when a family member or pet is detected but not for temporarily leaving the frame.

In an embodiment, once one of the inverse conditions are detected, conferencing manager 206 triggers a countdown on the user's conferencing display notifying the user that the user's audio/video will be re-enabled in X seconds, giving the user to opportunity to cancel the automatic re-enablement should the user choose to (where X is a configurable natural number). At the end of the countdown, distribution of the audio and/or video from the user computing system will resume to other participants of the conference.

Audio analyzer 304 captures audio data 302 and analyzes one or more of the frequency response, level and gain for any non-conference related sounds using well-known noise cancellation or other audio processing techniques and determines whether the audio from the user computing system should be distributed to other participants of the conference. Some examples which will result in setting audio pause indicator 306 include an external noise over a configurable sound threshold as measured in decibels, such as a dog barking, heavy construction noise, or operation of a lawn mower or leaf blower, or another person talking into the same microphone as the conference participant.

If it is detected that the user did not perform an action that would interfere with the user's audio source (e.g., answering a personal cell phone call), audio analyzer 304 may determine that the user's audio stream does not require muting and that the user can still be an active participant in the conference. For example, if the user leaves the video frame to get a document from the other side of the room but other participants can still hear the user's audio, audio analyzer may pause the user's video being distributed to other participants but leave the user's audio unmuted so other participants can still hear the user.

In another example, instead of pausing the video, video analyzer 310 may blur the user's image in the video frames being distributed to other participants while the video pause indicator is set. When the video pause indicator is cleared (or otherwise set to a negative status), video analyzer 310 stops blurring the user's image in the video frames being distributed to other participants.

In a further example, pausing audio and video distribution from a user computing system are mutually exclusive. That is, distribution of audio can be paused or video can be paused, but not both audio and video at the same time.

Figure 4:
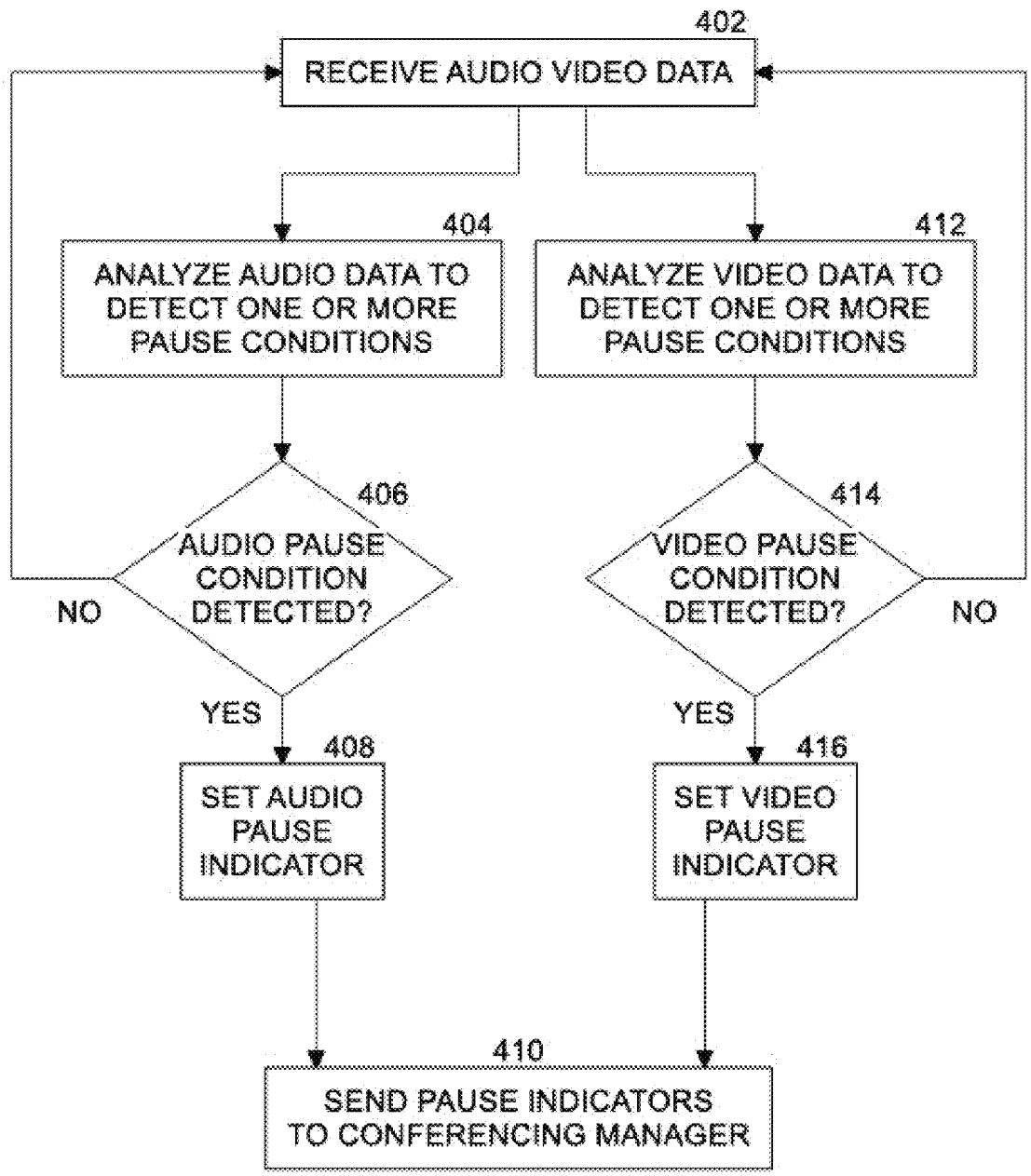
FIG. 4 is a flow diagram of a process for setting pause indicators according to some embodiments.

FIG. 4 is a flow diagram of a process 400 for setting pause indicators according to some embodiments. Process 400 may be performed by audio video data analyzer 208. At block 402, the audio video data analyzer receives audio video data 202 for a user computing system. At block 404, audio analyzer 304 analyzes audio data 302 to detect one or more audio pause conditions. If at block 406 one or more audio pause conditions are detected, then at block 408 audio analyzer 304 sets audio pause indicator 306 for the user. If at block 406 no audio pause condition is detected, then audio analysis processing continues at block 402 with the next set of audio video data. At block 412, video analyzer 310 analyzes video data 308 to detect one or more video pause conditions. If at block 414 one or more video pause conditions are detected, then at block 416 video analyzer 310 sets video pause indicator 312 for the user. If at block 414 no video pause condition is detected, then video analysis processing continues at block 402 with the next set of audio video data. In an embodiment, processing of blocks 404-408 and blocks 412-416 are performed simultaneously and in parallel. At block 410, audio video data analyzer 208 sends the pause indicators 210 (e.g., including audio pause indicator 306 and video pause indicator 312) to conferencing manager 206. Processing continues with the next set of audio video data being received at block 402.

Similar processing is performed to update (e.g., to clear or set to a negative status) the pause indicators 210 to cause the resumption of distribution of audio and/or video data from the user computing system when the audio and/or video pause conditions are no longer detected.

Figure 5:
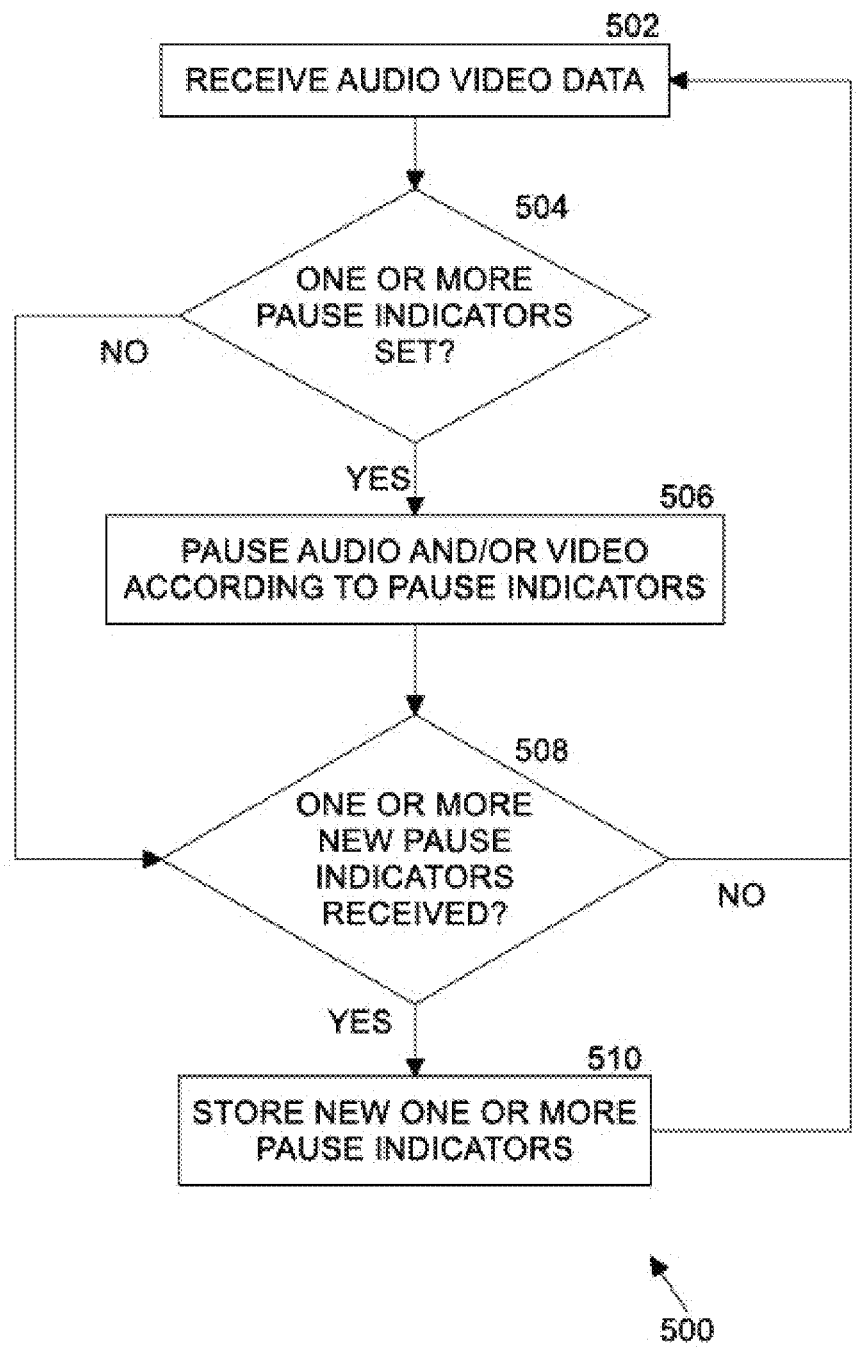
FIG. 5 is a flow diagram of a process for pausing distribution of audio and/or video data according to some embodiments.

FIG. 5 is a flow diagram of process 500 for pausing distribution of audio and/or video data according to some embodiments. Process 500 may be performed by conferencing manager 206. At block 502, conferencing manager 206 receives audio video data 202 from user computing systems (e.g., conference participants). At block 504, if one or more pause indicators 210 are set for a user computing system participating in a conference, at block 506 conferencing manager 206 pauses distribution of audio data 302 and/or video data 308 according to pause indicators 210 (e.g., audio pause indicator 306 and/or video pause indicator 312). This status will be maintained until updated. Conferencing manager 206 continues to receive audio video data 202 from the paused user computing system but does not distribute audio and/or video data to other participants. If no change in status of one or more pause indicators is determined at block 504, then processing continues with block 508. At block 508, when one or more new pause indicators are received from audio video data analyzer 208 (e.g., via performance of block 410 of FIG. 4), at block 510 conferencing manager 206 stores the new one or more pause indicators 210. For example, this may be performed when an audio and/or video pause condition is no longer detected and distribution of audio and/or video data is to be resumed. Processing continues with a new set of audio video data being received at block 502. If at block 508 no new pause indicators are received, processing continues with a new set of audio video data being received at block 502. Thus, distribution of audio and/or video data from a user computing system to other conference participants may be paused and/or resumed depending on the status of the pause indicators.

Figure 6:
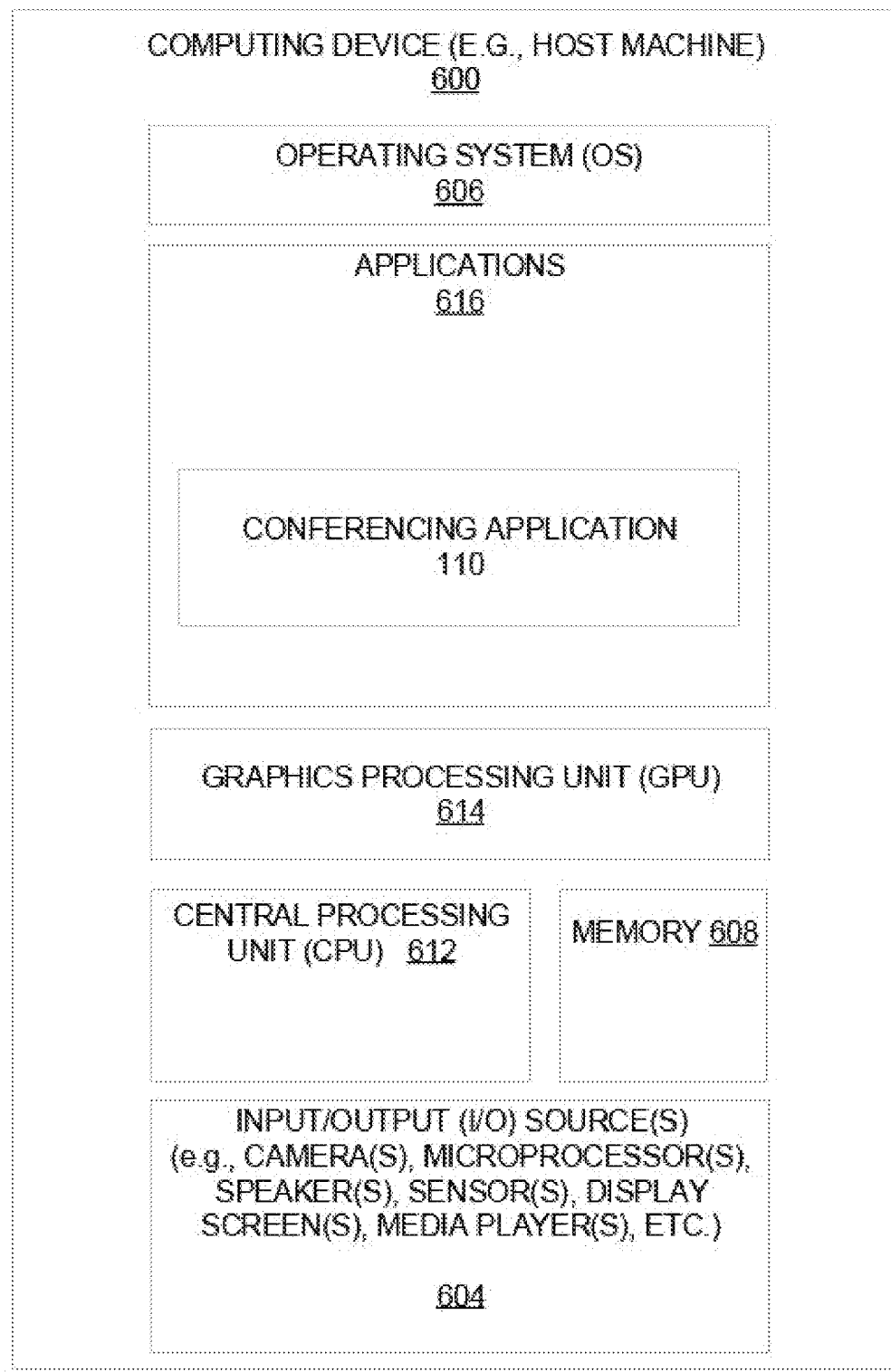
FIG. 6 illustrates a computing device employing a conferencing application, according to an embodiment.

FIG. 6 illustrates one embodiment of a computing device 600 (e.g., a host machine) executing one or more applications 616 such as conferencing application 110. Computing device 600 (e.g., smart wearable devices, virtual reality (VR) devices, head-mounted display (HMDs), mobile computers, Internet of Things (IoT) devices, laptop computers, desktop computers, server computers, smartphones, etc.) is shown as hosting conferencing application 110.

In some embodiments, some or all of conferencing application 110 may be hosted by or part of firmware of graphics processing unit (GPU) 614. In yet other embodiments, some or all of conferencing application 110 may be hosted by or be a part of firmware of central processing unit (central processing unit (CPU) or application processor) 612.

In yet another embodiment, conferencing application 110 may be hosted as software or firmware logic by operating system (OS) 606. In yet a further embodiment, conferencing application 110 may be partially and simultaneously hosted by multiple components of computing device 600, such as one or more of GPU 614, GPU firmware (not shown in FIG. 6), CPU 612, CPU firmware (not shown in FIG. 6), operating system 606, and/or the like. It is contemplated that conferencing application 110 or one or more of the constituent components may be implemented as hardware, software, and/or firmware.

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 600 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 600 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 600 may include a mobile computing device employing a computer platform hosting an integrated circuit ("IC"), such as system on a chip ("SoC" or "SOC"), integrating various hardware and/or software components of computing device 600 on a single chip.

As illustrated, in one embodiment, computing device 600 may include any number and type of hardware and/or software components, such as (without limitation) GPU 614, a graphics driver (also referred to as "GPU driver", "graphics driver logic", "driver logic", user-mode driver (UMD), UMD, user-mode driver framework (UMDF), UMDF, or simply "driver") (not shown in FIG. 6), CPU 612, memory 608, network devices, drivers, or the like, as well as input/output (I/O) sources 604, such as touchscreens, touch panels, touch pads, virtual or regular keyboards, virtual or regular mice, ports, connectors, etc.

Computing device 600 may include operating system (OS) 606 serving as an interface between hardware and/or physical resources of the computing device 600 and a user. It is contemplated that CPU 612 may include one or more processors, such as processors of FIG. 8, while GPU 614 may include one or more graphics processors (or multiprocessors).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated that some processes of the graphics pipeline as described herein are implemented in software, while the rest are implemented in hardware. A graphics pipeline (such as may be at least a part of conferencing application 110, for example, audio analyzer 304 and/or video analyzer 310) may be implemented in a graphics coprocessor design, where CPU 612 is designed to work with GPU 614 which may be included in or co-located with CPU 612. In one embodiment, GPU 614 may employ any number and type of conventional software and hardware logic to perform the conventional functions relating to graphics rendering as well as novel software and hardware logic to execute any number and type of instructions.

Memory 608 may include a random-access memory (RAM) comprising application database having object information. A memory controller hub (not shown in FIG. 6) may access data in the RAM and forward it to GPU 614 for graphics pipeline processing. RAM may include double data rate RAM (DDR RAM), extended data output RAM (EDO RAM), etc. CPU 612 interacts with a hardware graphics pipeline to share graphics pipelining functionality.

Processed data is stored in a buffer in the hardware graphics pipeline, and state information is stored in memory 608. The resulting image is then transferred to I/O sources 604, such as a display component for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 608 may comprise a pre-allocated region of a buffer (e.g., frame buffer); however, it should be understood by one of ordinary skill in the art that the embodiments are not so limited, and that any memory accessible to the lower graphics pipeline may be used. Computing device 600 may further include an input/output (I/O) control hub (ICH) (not shown in FIG. 6), as one or more I/O sources 604, etc.

CPU 612 may include one or more processors to execute instructions to perform whatever software routines the computing system implements. The instructions frequently involve some sort of operation performed upon data. Both data and instructions may be stored in system memory 608 and any associated cache. Cache is typically designed to have shorter latency times than system memory 608; for example, cache might be integrated onto the same silicon chip(s) as the processor(s) and/or constructed with faster static RAM (SRAM) cells whilst the system memory 608 might be constructed with slower dynamic RAM (DRAM) cells. By tending to store more frequently used instructions and data in the cache as opposed to the system memory 608, the overall performance efficiency of computing device 600 improves. It is contemplated that in some embodiments, GPU 614 may exist as part of CPU 612 (such as part of a physical CPU package) in which case, memory 608 may be shared by CPU 612 and GPU 614 or kept separated.

System memory 608 may be made available to other components within the computing device 600. For example, any data (e.g., input graphics data) received from various interfaces to the computing device 600 (e.g., keyboard and mouse, printer port, Local Area Network (LAN) port, modem port, etc.) or retrieved from an internal storage element of the computing device 600 (e.g., hard disk drive) are often temporarily queued into system memory 608 prior to being operated upon by the one or more processor(s) in the implementation of a software program. Similarly, data that a software program determines should be sent from the computing device 600 to an outside entity through one of the computing system interfaces, or stored into an internal storage element, is often temporarily queued in system memory 608 prior to its being transmitted or stored.

Further, for example, an ICH may be used for ensuring that such data is properly passed between the system memory 608 and its appropriate corresponding computing system interface (and internal storage device if the computing system is so designed) and may have bi-directional point-to-point links between itself and the observed I/O sources/devices 604. Similarly, an MCH may be used for managing the various contending requests for system memory 608 accesses amongst CPU 612 and GPU 614, interfaces and internal storage elements that may proximately arise in time with respect to one another.

I/O sources 604 may include one or more I/O devices that are implemented for transferring data to and/or from computing device 600 (e.g., a networking adapter); or, for a large-scale non-volatile storage within computing device 600 (e.g., hard disk drive). User input device, including alphanumeric and other keys, may be used to communicate information and command selections to GPU 614. Another type of user input device is cursor control, such as a mouse, a trackball, a touchscreen, a touchpad, or cursor direction keys to communicate direction information and command selections to GPU 614 and to control cursor movement on the display device. Camera and microphone arrays of computing device 600 may be employed to observe gestures, record audio and video and to receive and transmit visual and audio commands.

Computing device 600 may further include network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computing device may also be coupled to a number of peripheral devices, clients, control surfaces, consoles, or servers via a conventional network infrastructure, including an Intranet or the Internet, for example.

It is to be appreciated that a lesser or more equipped system than the example described above may be used for some implementations. Therefore, the configuration of computing device 600 may vary from implementation to implementation depending upon numerous factors, such as price constraints, performance requirements, technological improvements, or other circumstances. Examples of the electronic device or computing device 600 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more tangible non-transitory machine-readable media having stored thereon machine-executable instructions that, when executed by one or more machines such as a computer, network of computers, or other electronic devices, may result in the one or more machines carrying out operations in accordance with embodiments described herein. A tangible non-transitory machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Machine Learning Overview

A machine learning algorithm is an algorithm that can learn based on a set of data. Embodiments of machine learning algorithms can be designed to model high-level abstractions within a data set. For example, classification algorithms can be used to determine which of several categories to which a given input belongs; regression algorithms can output a numerical value given an input; and pattern recognition algorithms can be used to generate translated text or perform text to speech and/or speech recognition.

A type of machine learning algorithm is a neural network (such as trained neural network). There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 7:
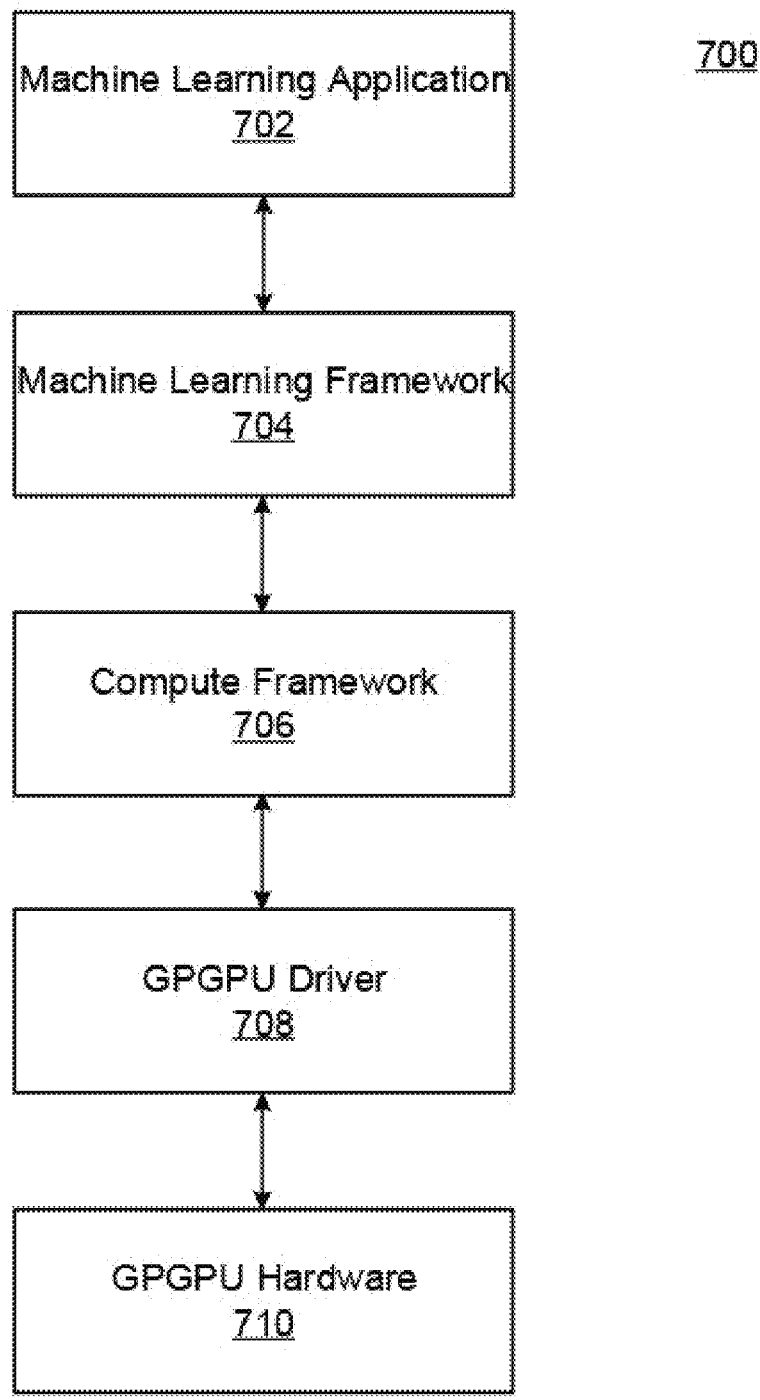
FIG. 7 illustrates a machine learning software stack, according to an embodiment.

FIG. 7 is a generalized diagram of a machine learning software stack 700. A machine learning application 702 (e.g., conferencing application 110, audio analyzer 304 and/or video analyzer 310) can be configured to train a neural network using a training dataset or to use a trained deep neural network to implement machine intelligence. The machine learning application 702 can include training and inference functionality for a neural network and/or specialized software that can be used to train a neural network before deployment. The machine learning application 702 can implement any type of machine intelligence including but not limited to classification, image recognition, audio recognition, mapping and localization, autonomous navigation, speech synthesis, medical imaging, or language translation. In an embodiment, machine learning application 702 (e.g., audio video data analyzer 208) performs audio and/or video analysis of audio video data 202 to determine audio and/or video pause indicators 306, 312 as discussed above.

Hardware acceleration for the machine learning application 702 can be enabled via a machine learning framework 704. The machine learning framework 704 can provide a library of machine learning primitives. Machine learning primitives are basic operations that are commonly performed by machine learning algorithms. Without the machine learning framework 704, developers of machine learning algorithms would be required to create and optimize the main computational logic associated with the machine learning algorithm, then re-optimize the computational logic as new parallel processors are developed. Instead, the machine learning application can be configured to perform computations using the primitives provided by the machine learning framework 704. Primitives include tensor convolutions, activation functions, and pooling, which are computational operations that are performed while training a convolutional neural network (CNN). The machine learning framework 704 can also provide primitives to implement basic linear algebra subprograms performed by many machine-learning algorithms, such as matrix and vector operations.

The machine learning framework 704 can process input data received from the machine learning application 702 and generate the appropriate input to a compute framework 706. The compute framework 706 can abstract the underlying instructions provided to a GPGPU driver 705 to enable the machine learning framework 704 to take advantage of hardware acceleration via the GPGPU hardware 710 without requiring the machine learning framework 704 to have intimate knowledge of the architecture of the GPGPU hardware 710. Additionally, the compute framework 706 can enable hardware acceleration for the machine learning framework 704 across a variety of types and generations of the GPGPU hardware 710.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One type of neural network is the feedforward network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., image classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different tasks.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 8:
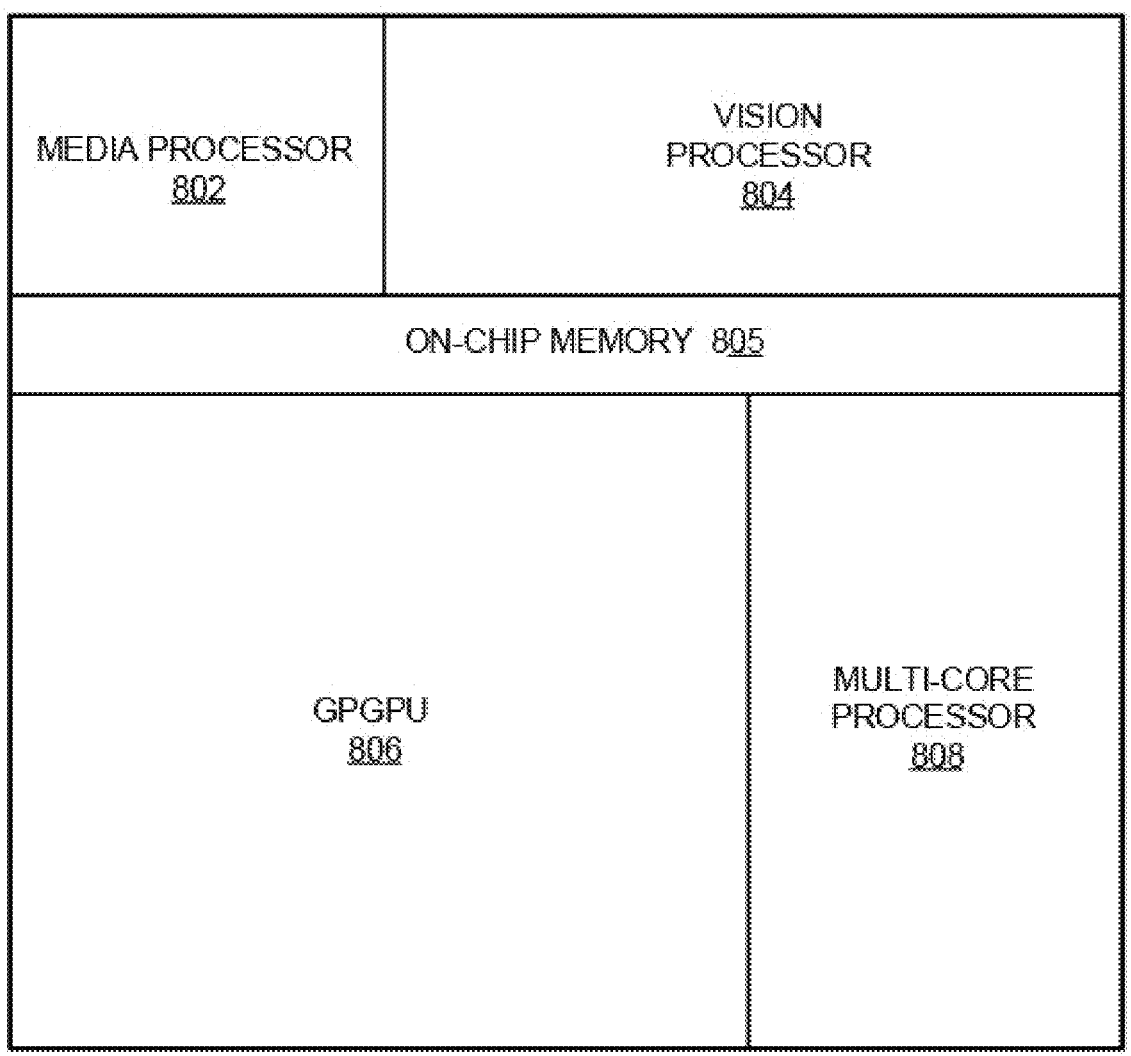
FIG. 8 illustrates a system on a chip (SOC) suitable for performing video conferencing according to some embodiments.

FIG. 8 illustrates a system on a chip (SOC) 800 suitable for performing inferencing using a trained model to perform audio processing by audio analyzer 304 and/or video processing by video analyzer 310. Thus, one or more components of FIG. 8 may be used to implement conferencing application 110. The SOC 800 can integrate processing components including a media processor 802, a vision processor 804, a GPGPU 806 and a multi-core processor 808. The SOC 800 can additionally include on-chip memory 805 that can enable a shared on-chip data pool that is accessible by each of the processing components. The processing components can be optimized for low power operation to enable deployment to a variety of machine learning platforms, including autonomous vehicles and autonomous robots.

The multi-core processor 808 can include control logic to assist with sequencing and synchronization of data transfers and shared memory operations performed by the media processor 802 and the vision processor 804. The multi-core processor 808 can also function as an application processor to execute software applications that can make use of the inferencing compute capability of the GPGPU 806. For example, at least a portion of conferencing application 110 can be implemented in software executing on the multi-core processor 808. Such software can directly issue computational workloads to the GPGPU 806 or the computational workloads can be issued to the multi-core processor 808, which can offload at least a portion of those operations to the GPGPU 806.

Flowcharts representative of example hardware logic, machine readable instructions, hardware implemented state machines, and/or any combination thereof for implementing computing device 600, for example, are shown in FIGS. 4 and 5. The machine-readable instructions may be one or more executable programs or portion(s) of an executable program for execution by a computer processor such as the processor 612 shown in the example computing device 600 discussed above in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and 5, many other methods of implementing the example conferencing application 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc., in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A method comprising:
analyzing, by a conferencing application hosted on a server, video data received from a user computing system operating as one of a plurality of participants in a conference managed by the conferencing application to detect one or more video pause conditions based at least in part on analyzing the video data, wherein the analyzing the video data comprises analyzing sequential video frames of the video data to determine one or more changes in one or more objects identified in the sequential video frames to detect one or more video pause conditions, and wherein the one or more video pause conditions comprises a user of the user computing system leaving one or more video frames of the video data;
automatically setting a video pause indicator when the one or more video pause conditions are detected;
pausing distribution of the video data to computing systems of other participants of the conference when the video pause indicator is set;
analyzing, by the conferencing application, audio data received from the user computing system to detect one or more audio pause conditions based at least in part on analyzing the audio data;
setting an audio pause indicator when the one or more audio pause conditions are detected;
pausing distribution of the audio data to the computing systems of the other participants of the conference when the audio pause indicator is set; and
providing, by a conferencing manager, the user with a countdown on a user's conferencing display to notify the user that the video data and/or audio data will resume in X seconds, wherein X is any configurable number, and the user may cancel the resumption prior to the X seconds.

2. The method of claim 1 that further comprises the steps of:
receiving the video data from the user computing system while the video pause indicator is set;
analyzing the video data; and
updating the video pause indicator to cleared when the one or more video pause conditions are no longer detected based at least in part on analyzing the video data.

3. The method of claim 1 that further comprises blurring an image of a user of the user computing system in the video data and distributing the video data to the computing systems of the other participants when the video pause indicator is set instead of pausing distribution of the video data.

4. The method of claim 1, wherein the one or more video pause conditions comprises a user of the user computing system putting at least one of a cell phone and a land line telephone handset to a head of a user.

5. The method of claim 1, wherein the one or more video pause conditions comprises at least one of a person other than a user of the user computing system and a pet entering one or more video frames of the video data.

6. The method of claim 1 that further comprises the steps of:
resuming distribution of the audio data to the computing systems of the other participants of the conference when the audio pause indicator is cleared, and
resuming distribution of the video data to the computing systems of the other participants of the conference when the video pause indicator is cleared.

7. The method of claim 1 that further comprises the steps of:
receiving the audio data from the user computing system while the audio pause indicator is set;
analyzing the audio data; and
updating the audio pause indicator to cleared when the one or more audio pause conditions are no longer detected based at least in part on analyzing the audio data.

8. The method of claim 1 that further comprises performing analyzing the audio data and analyzing the video data simultaneously and in parallel.

9. The method of claim 1, wherein analyzing, by the conferencing application, the audio data received from the user computing system to detect the one or more audio pause conditions based at least in part on analyzing the audio data comprises analyzing one or more of frequency response, level and gain of the audio data.

10. The method of claim 1, wherein the one or more audio pause conditions comprises a noise detected in the audio data over a configurable sound threshold.

11. The apparatus of claim 1, wherein the one or more video pause indicators are the same as the one or more audio pause indicators.

12. At least one non-transitory machine-readable storage medium comprising instructions that, when executed, cause at least one processor to:
analyze, by a conferencing application hosted on a server, video data received from a user computing system operating as one of a plurality of participants in a conference managed by the conferencing application to detect one or more video pause conditions based at least in part on analyzing the video data, wherein instructions to analyze the video data comprise instructions to analyze sequential video frames of the video data to determine one or more changes in one or more objects identified in the sequential video frames to detect one or more video pause conditions, and wherein the one or more video pause conditions comprises a user of the user computing system leaving one or more video frames of the video data;
automatically set a video pause indicator when the one or more video pause conditions are detected;
pause distribution of the video data to computing systems of other participants of the conference when the video pause indicator is set; and
provide, by a conferencing manager, the user with a countdown on a user's conferencing display to notify the user that the video data will resume in X seconds, wherein X is any configurable number, and the user may cancel the resumption prior to the X seconds.

13. The at least one non-transitory machine-readable storage medium of claim 12 comprising instructions that, when executed, further cause the at least one processor to:
receive the video data from the user computing system while the video pause indicator is set;
analyze the video data; and
update the video pause indicator to cleared when the one or more video pause conditions are no longer detected based at least in part on analyzing the video data.

14. The at least one non-transitory machine-readable storage medium of claim 12 comprising instructions that, when executed, further cause the at least one processor to:
analyze, by the conferencing application, audio data received from the user computing system to detect one or more audio pause conditions based at least in part on analyzing the audio data;
set an audio pause indicator when the one or more audio pause conditions are detected; and
pause distribution of the audio data to the computing systems of the other participants of the conference when the audio pause indicator is set.

15. The at least one non-transitory machine-readable storage medium of claim 14 comprising instructions that, when executed, further cause the at least one processor to:
resume distribution of the audio data to the computing systems of the other participants of the conference when the audio pause indicator is cleared.

16. The at least one non-transitory machine-readable storage medium of claim 14 comprising instructions that, when executed, further cause the at least one processor to:
receive the audio data from the user computing system while the audio pause indicator is set;
analyze the audio data; and
update the audio pause indicator to cleared when the one or more audio pause conditions are no longer detected based at least in part on analyzing the audio data.

17. The apparatus of claim 14, wherein the one or more video pause indicators are the same as the one or more audio pause indicators.

18. An apparatus comprising:
a video analyzer to analyze video data, received from a user computing system operating as one of a plurality of participants in a conference managed by a conferencing application hosted on a server, to detect one or more video pause conditions based at least in part on analyzing the video data, wherein the video analyzer to analyze the video data comprises the video analyzer to analyze sequential video frames of the video data to determine one or more changes in one or more objects identified in the sequential video frames to detect one or more video pause conditions, and wherein the one or more video pause conditions comprises a user of the user computing system leaving one or more video frames of the video data; and an audio analyzer to analyze audio data, received from a user computing system operating as one of a plurality of participants in a conference managed by a conferencing application hosted on a server, to detect one or more audio pause conditions based at least in part on analyzing the audio data, wherein the audio analyzer determines one or more changes in the audio data to detect one or more audio pause conditions; and a conferencing manager to (a) pause distribution of the video data to computing systems of other participants when the one or more video pause conditions are detected; and (b) pause distribution of the audio data to computing systems of other participants when the one or more audio pause conditions are detected, and (c) provide the user with a countdown on a user's conferencing display to notify the user that the video data and/or audio data will resume in X seconds, wherein X is any configurable number, and the user may cancel the resumption prior to the X seconds.

19. The apparatus of claim 18 that further comprises:

an audio analyzer to analyze audio data received from the user computing system to detect one or more audio pause conditions based at least in part on analyzing the audio data;

wherein the conferencing manager is to automatically pause distribution of the audio data to the computing systems of the other participants of the conference when the one or more audio pause conditions are detected.

20. The apparatus of claim 18, wherein the one or more video pause indicators are the same as the one or more audio pause indicators.

* * * * *